United States Patent
Mizue et al.

(10) Patent No.: US 7,322,753 B2
(45) Date of Patent: Jan. 29, 2008

(54) OPTICAL MODULE HAVING A SIMPLE MECHANISM FOR RELEASING FROM A CAGE

(75) Inventors: Toshio Mizue, Kanagawa (JP); Manabu Ishikawa, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/588,296

(22) Filed: Oct. 27, 2006

(65) Prior Publication Data

US 2007/0041687 A1   Feb. 22, 2007

Related U.S. Application Data

(63) Continuation of application No. 10/854,208, filed on May 27, 2004, now Pat. No. 7,201,520.

(30) Foreign Application Priority Data

May 30, 2003  (JP) .............................. 2003-155456
Sep. 19, 2003  (JP) .............................. 2003-329102

(51) Int. Cl.
    *G02B 6/36* (2006.01)
(52) U.S. Cl. ...................................................... 385/92
(58) Field of Classification Search .................. 385/92
    See application file for complete search history.

(56) References Cited

U.S. PATENT DOCUMENTS

| 6,439,918 | B1 | 8/2002 | Togami et al. |
| 6,447,170 | B1 | 9/2002 | Takahashi et al. |
| 6,556,446 | B1 | 4/2003 | Hwang |
| 6,744,963 | B2 | 6/2004 | Hwang |
| 6,786,653 | B1 | 9/2004 | Hwang et al. |
| 6,793,517 | B2 * | 9/2004 | Neer et al. ................... 439/372 |
| 6,916,123 | B2 * | 7/2005 | Kruger et al. ................ 385/92 |
| 6,997,622 | B2 * | 2/2006 | Dodds et al. ................. 385/92 |
| 2003/0002823 | A1 | 1/2003 | Wu |
| 2003/0072539 | A1 | 4/2003 | Huang et al. |
| 2003/0072540 | A1 | 4/2003 | Huang |
| 2003/0156801 | A1 * | 8/2003 | Hwang ......................... 385/92 |
| 2003/0171022 | A1 * | 9/2003 | Distad et al. ............... 439/372 |
| 2004/0008954 | A1 | 1/2004 | Shaw et al. |
| 2004/0033030 | A1 | 2/2004 | Ohbayashi et al. |
| 2004/0062493 | A1 | 4/2004 | Ishigami et al. |
| 2004/0105239 | A1 | 6/2004 | Chiang |
| 2004/0197055 | A1 | 10/2004 | Fischer et al. |
| 2004/0197056 | A1 | 10/2004 | Oki |
| 2005/0100292 | A1 | 5/2005 | Malagrino |
| 2005/0117854 | A1 | 6/2005 | Chiu et al. |

* cited by examiner

*Primary Examiner*—Ellen E. Kim
(74) *Attorney, Agent, or Firm*—Venable LLP; Michael A. Sartori; Steven J. Schwarz (57) ABSTRACT

The present invention provides an optical module having a pluggable configuration, which enables to latch with the cage when the optical connector is mated with the receptacle. The optical module of the present invention is secured in the cage by latching the latch of the cage and the projection of the module. The actuator of the module, having a slab protruding into the optical receptacle, is able to slide along the direction the module is inserted into the cage. When the optical connector is in the optical receptacle, the slab of the actuator butts the optical connector and is prohibited to slide, accordingly, the optical module can not released from the cage.

9 Claims, 12 Drawing Sheets

OPTICAL MODULE HAVING A SIMPLE MECHANISM FOR RELEASING FROM A CAGE

CROSS-REFERENCE TO RELATED APPLICATIONS

This application is a continuation of U.S. patent application Ser. No. 10/854,208, filed May 27, 2004, now U.S. Pat. No. 7,201,520 which claims priority of JP 2003-155456 filed on May 30, 2003 in Japan, and JP 2003-329102 filed on Sep. 19, 2003 in Japan, the priority of both of which is claimed herein. The entire content of the aforementioned three applications is expressly incorporated herein by reference.

BACKGROUND OF THE INVENTION

1. Field of the Invention

This invention relates to an optical module, especially, an optical module having a hot-pluggable function.

2. Related Prior Art

Optical modules having a hot-pluggable function are plugged in the cage and electrically coupled with the connector disposed on the host board. Various types of pluggable module are well known in the field. One has been disclosed in the U.S. Pat. No. 6,439,918. That is, the module disclosed in the '918 patent includes an optical receptacle for receiving the optical connector, a block having a latching/releasing mechanism, and a bail for leading the releasing action.

That is, the block includes a hook in one end thereof and a groove for receiving a portion of the bail therein. The hook latches with the slot in the cage, whereby the optical module is secured and fixed within the cage. When rotating the bail by the portion put in the groove as the center, the hook, linking with the motion of the bail, changes its hooking position with the cage. Accordingly, the optical module may be released from the cage. In the state that the optical connector is mated with the optical receptacle of the module, the bail can not rotate, accordingly, the optical module can not released from the cage.

SUMMARY OF THE INVENTION

One object of the present invention is to provide an optical module, which realizes the pluggable function with a simple and reliable structure.

According to one aspect of the present invention, on optical module to be mated with an optical connector, and is plugged in a space of a cage mounted on a host board is claimed. The cage has a resilient latch extending from the cage and protruding into the space. The optical module comprises an optical sub-assembly that includes an optical device, such as semiconductor laser diode or semiconductor photodiode, a housing, an receptacle body, and an actuator. The housing includes a projection butted to the latch when the optical module is plugged in the cage. The receptacle body, one end of which includes a receptacle for mating with the optical connector and the other end of which installs the optical sub-assembly. Accordingly, the optical device in the optical sub-assembly optically couples with the optical connector within the receptacle body. The actuator may be slide between the first position and the second position. At second position, the actuator presses the latch provided in the cage outward from the space. Accordingly, the hooking mechanism between the latch of the cage and the projection provided in the housing may be unfastened at the second position of the actuator, thereby releasing the optical module from the cage.

The actuator may include a pair of arms, each has an end portion, and a center portion connecting respective arms. The end portion widens in their span with relative to the length of the center portion. Accordingly, the actuator may press outward the resilient latch provided in the cage.

The housing may has a groove for receiving the arm of the actuator. The arm may slide in the groove. Further, the projection provided in the housing may be disposed within the groove and the end portion of the arm may be forked such that the projection of the housing is but between the forked end portion of the arm.

The housing may include an upper body and a lower body. Both bodies have a pair of said walls. The side walls of the lower body covers the side walls of the upper body. Moreover, the side wall of the upper body provides the groove and the projection, while the side wall of the lower body provides an opening. The resilient latch of the cage may butt against the projection provided in the upper body by passing through the opening provided in the lower body. The arms of the actuator may be disposed between the side wall of the upper body and the side wall of the lower body.

The center portion of the actuator may provide a flange and the receptacle body may provide an opening for passing the flange of the actuator into the receptacle. When the optical connector is mated with the receptacle body, the flange of the actuator may butt against the optical connector, whereby the actuator is prevented to slide from the first position to the second position.

The optical module of the present invention may further comprise a bail for sliding the actuator, and the lower body of the housing provides a slot, the bail couples to the actuator therethrough. The first position of the actuator corresponds to that the bail is positioned in one end of the slot, and the second position of the actuator corresponds to that that bail is positioned in the other end of the slot.

In another configuration of the actuator and the bail, the actuator may further includes a pair of front side walls, each extending from the arm of the actuator with a span therebetween being greater than the length of the center portion of the actuator. The bail may be positioned inside of the front side walls of the actuator.

The housing may include a projection and the bail may include a hole mating with the projection of the housing. The bail may further include a projection and the actuator may include a slot for receiving the projection of the bail. In these configuration of the housing, the bail, and the actuator, the actuator may slide from the first position to the second position by moving the projection of the bail from an end of the slot of the actuator to a center thereof by pivoting the bail around the projection of the housing as the center thereof.

DETAILED DESCRIPTION OF PREFERRED EMBODIMENTS

First Embodiment

An optical module 1 according to the first embodiment of the present invention will be described as referring to accompanying drawings. In the description and the drawings, the same symbols and numerals without overlapping explanations will refer same elements.

Figure 1:
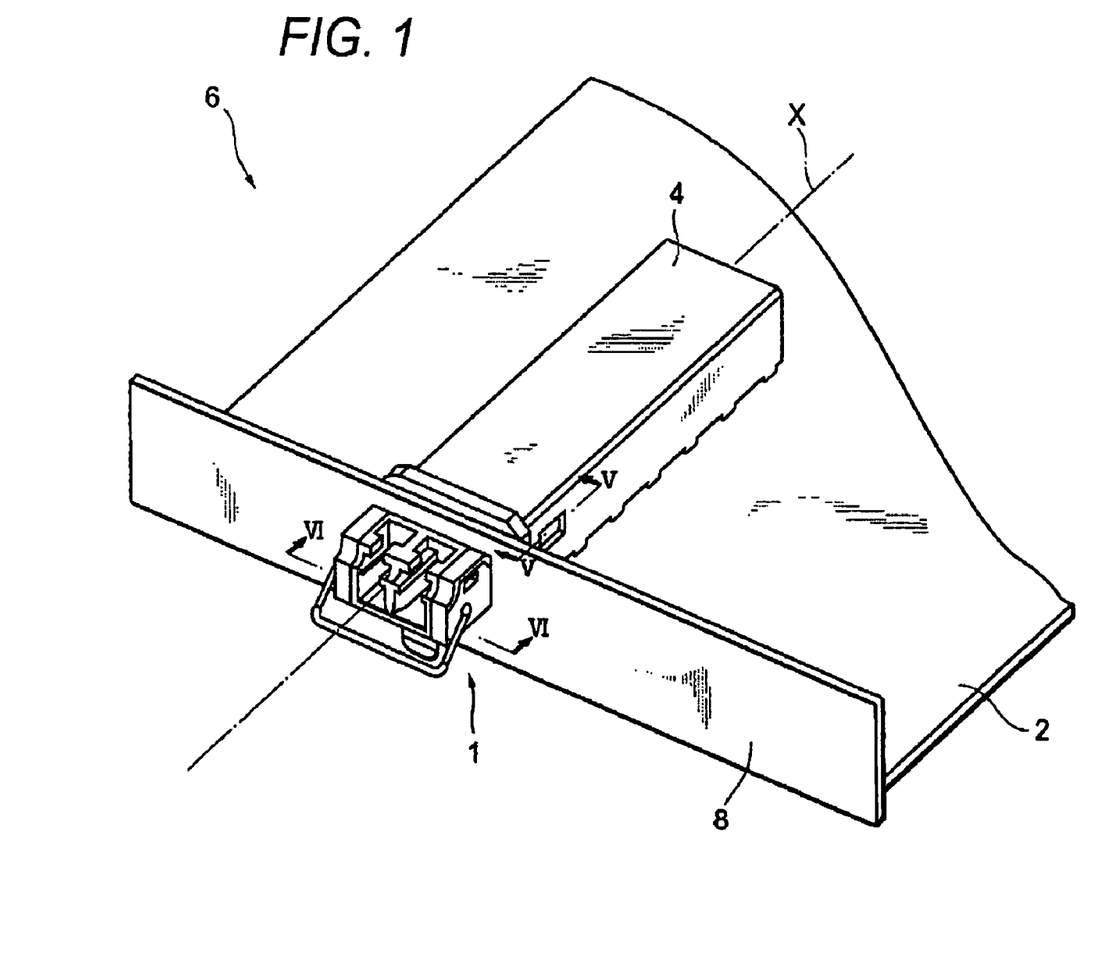
FIG. 1 is a perspective view showing an optical module plugged in the cage on the host board.
Figure 2:
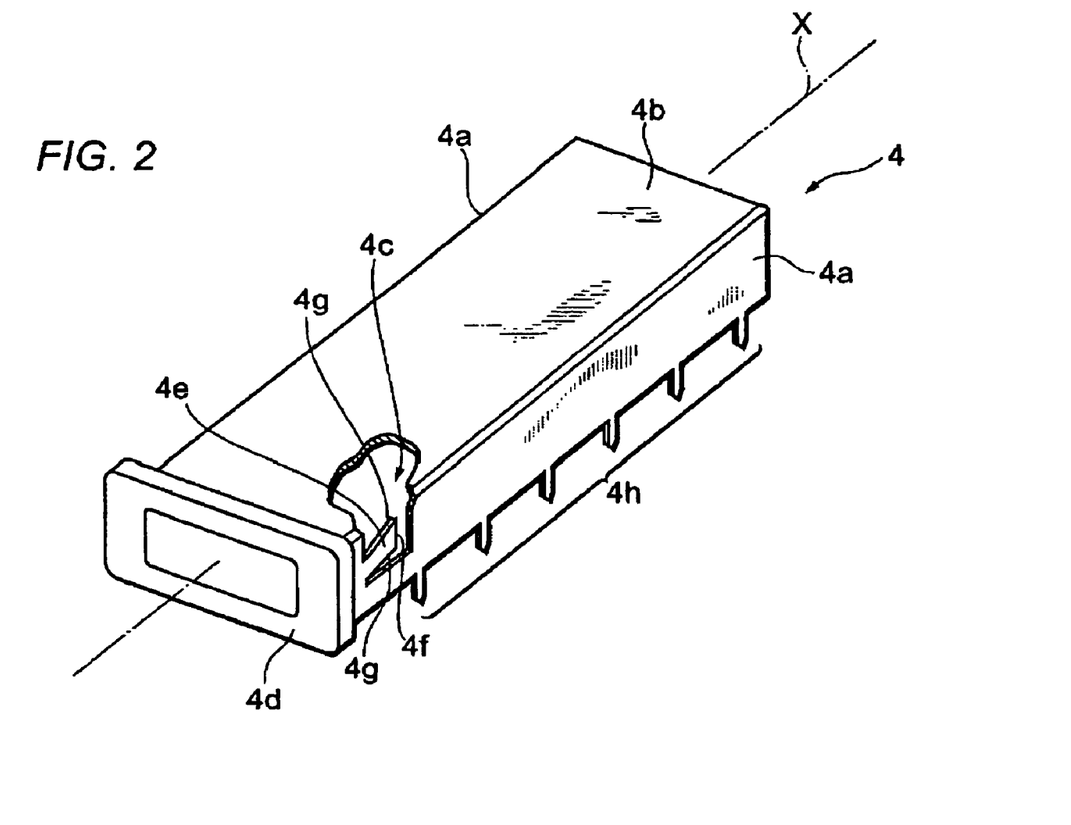
FIG. 2 is a partially cut out view of the cage to illustrate the latch.

FIG. 1 a perspective view showing the optical module 1 according to the present invention, a host board 2, and a cage 4 installed on the host board 2. FIG. 2 shows a cage 4a portion of which is broken to clarify the inside of the cage and the structure of the latch for hooking the optical module 1 to the cage 4. In the description, the upper/lower means the state where the cage 4 is assembled from the upper of the host board, namely, the state shown in FIG. 1. The front/rear means the direction to/from which the optical module 1 is inserted/released with respect to the cage 4.

The cage 4 has a pair of side walls 4a and an upper wall 4b, these walls forming a space 4c in which the optical module is received. The front end 4d of the cage 4 has an opening through which the optical module 1 is inserted into the space. This opening, as shown in FIG. 1, communicates with an opening formed in the face panel 8 of the host board 2.

Respective side walls include a latch 4e extending therefrom and protruding into the space 4c such that the edge thereof points to the rear. Further, the latch 4e may be resilient and bend toward the outside of the space 4c.

On the lower side of the cage is provided a plurality of pins 4h along the direction X with a span. By inserting respective pins into the via holes provided in the host board 2, the cage 4 is assembled in and fixed to the host board 4. Into the cage 4 thus assembled, the optical module 1 is inserted from the opening provided in the front end 4d of the cage 4.

Figure 3:
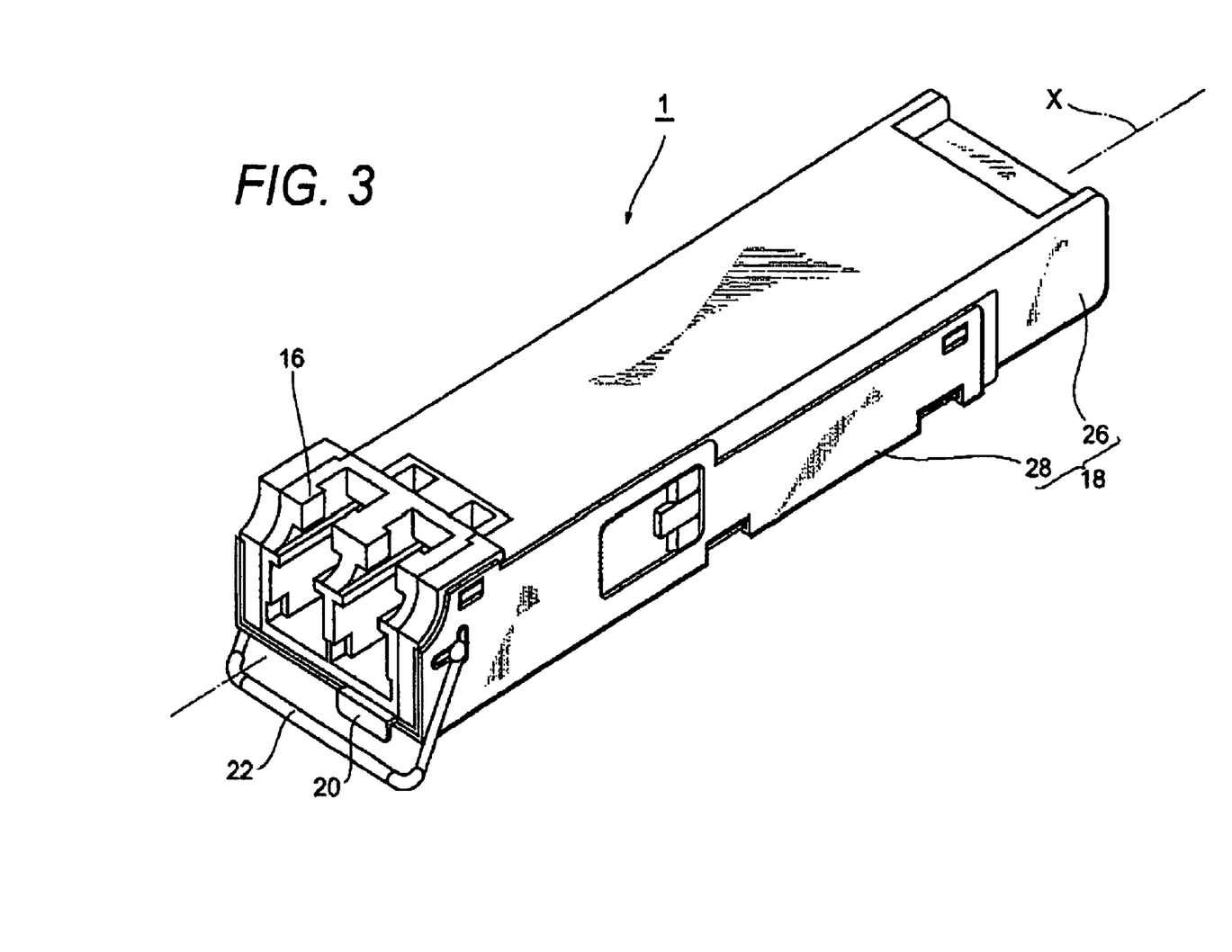
FIG. 3 is a perspective view of the optical module according to the first embodiment of the present invention.
Figure 4:
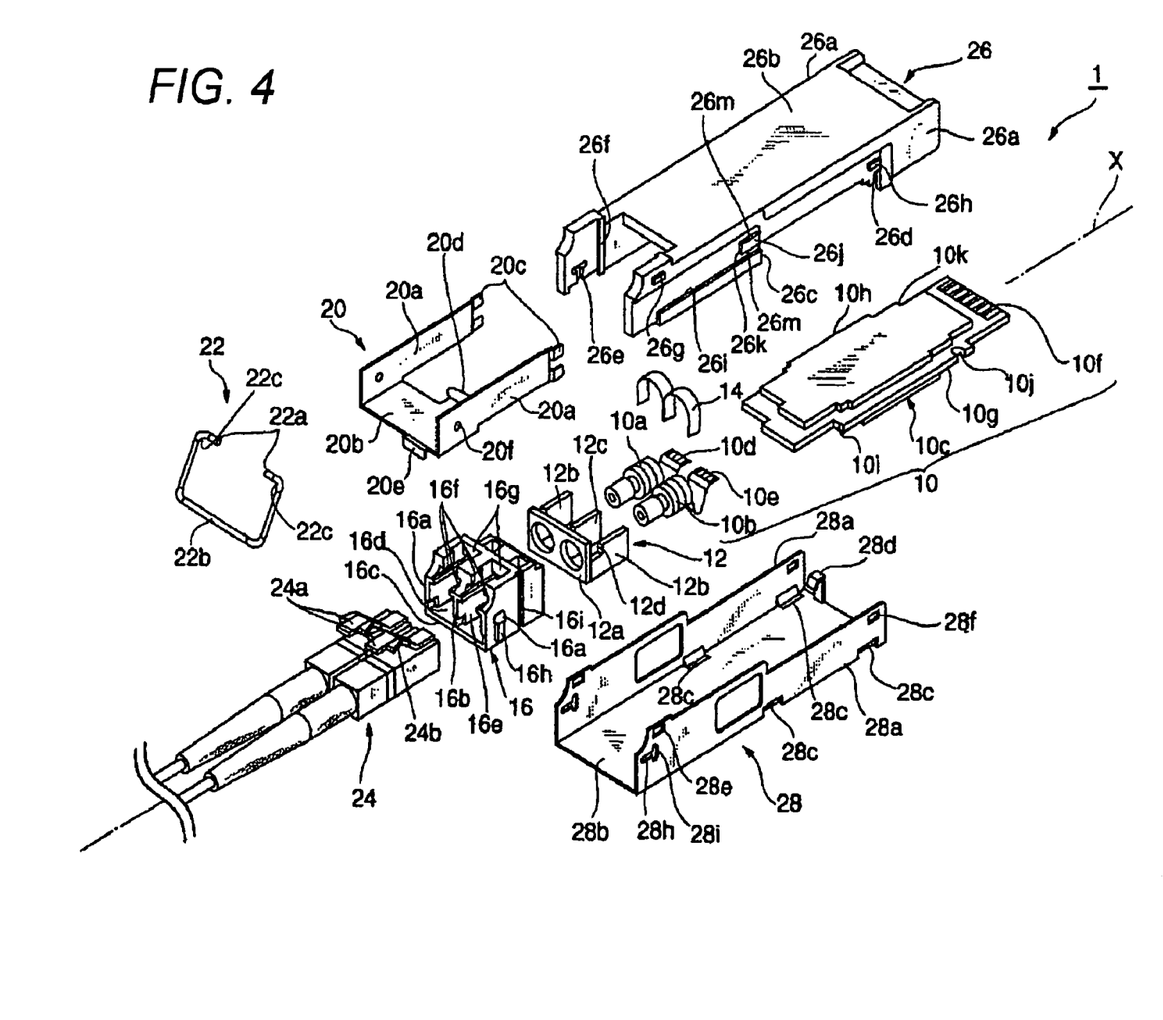
FIG. 4 is an exploded view of the optical module according to the first embodiment.

FIG. 3 is a perspective view, and FIG. 4 is an exploded view of the optical module 1 of the present invention. The optical module includes a primary unit 10, a holder 12, a bracket 14, a receptacle body 16, a housing 18, and actuator 20 and a bail 22. The housing comprises an upper body 26 and a lower body 28 communicating with the upper body and forming a space into which the primary unit 10 is received.

The primary unit 10 includes a semiconductor optical device. That is, the primary unit 10 includes a transmitting optical sub-assembly TOSA 10a, a receiving optical sub-assembly ROSA 10b, a substrate 10c, and wiring substrates 10d and 10e for connecting the TOSA 10a to the substrate 10c and the ROSA 10b to the substrate 10c, respectively.

The TOSA 10A includes a light-emitting device such as semiconductor laser diode, which emits light to a direction parallel to the axis X by supplying a signal via the wiring substrate 10d. In this embodiment, the wiring substrate is a flexible printed circuit, but another configuration such as lead pins may be applicable.

The ROSA 10B installs a light-receiving device such as a photo diode, and outputs an electrical signal, which corresponds to an incident light along to the direction X, via the wiring substrate 10e to the substrate 10c. The wiring substrate 10e of the present embodiment is exemplified by a flexible printed circuit board, lead pins instead of the flexible printed circuit board may be applicable.

The substrate 10c extends along the axis X, one end of which is connected by the wiring substrates 10d and 10e. Other end of the wiring substrate 10d provides a edge plug 10f that electrically mates with an electrical connector not shown in FIG. 4 disposed on the mother board.

The TOSA 10A and the ROSA 10B are fixed to the OSA holder 12 by the bracket 14. The OSA holder 12 has a front wall 12a, a pair of side wall 12b, and a partition wall 12c which demarcates spaces where the TOSA and the ROSA are installed. The front wall 12a has two openings into which the head portion of the TOSA 10a and the ROSA 10b are inserted. The side wall 12b and the partition wall 12c has a cut 12d, into which the bracket 14 is inserted and thus the TOSA 10a and the ROSA 10b are fixed to the holder 12. The holder 12 is assembled with the receptacle body 16 with the TOSA 10a and the ROSA 10b being fixed thereto.

The receptacle body 16 has a pair of side wall 16a, a partition wall 16b, both extending along the axis X, and a bottom 16c supporting the side wall 16a and the partition wall 16b. These side wall, partition wall and the bottom form two receptacle 16d and 16e having two openings for receiving the optical connector 24. On the other end of the receptacle body 16, as previously described, is assembled by the holder 12 with the TOSA 10a and the ROSA 10b. That is, the other end of the receptacle 16d is inserted with the head of the TOSA 10a and that of the ROSA 10b, and thus the TOSA 10a and the ROSA 10b optically couple with the optical fiber secured in the optical connector 24 in the receptacle.

The receptacle body is preferably made of resin coated with nickel thereon, whereby the dimensional accuracy and the noise immunity of the receptacle body 16 can be enhanced. Another material, for example, zinc alloy may be applicable to the receptacle body 16.

Inner surface of the side wall 16a and the partition wall 16b of the receptacle body provides grooves 16f extending along the axis X. On the top of the receptacle body 16 has opening 16g so as to reach the grooves 16f. These grooves 16f and opening 16g are used for fixing the optical connector 24 within the receptacles 16d and 16e. The optical connector 24 has a latch 24a with a pair of hook on both side of the latch 24. The hook 24g protrudes from the latch 24a to a direction across the axis X. When the optical connector 24 is inserted in the receptacle 16d and 16e, the hook 24b passes along the groove 16f by pushing the latch 24a, and the connector 24 is fixed to the receptacle 16d and 16e by releasing the latch 24a at the position the hook 24b is in the opening 16g.

The housing 18 includes an upper body 26 and a lower body 28. The upper body 26 has a pair of side wall 26a and a top wall 26b connecting the side walls 26a. The upper body may be made of aluminum alloy, and may be coupled with the substrate 10c via a thermal sheet made of, for example, silicone. Thus, heat generated by devices mounted on the substrate 10c may effectively dissipate to the upper body and the ambient, accordingly, thermal stability of the optical module 1 can be enhanced.

The side wall 26a of the upper body 26 has a cut, and one end of the cut 26c is in contact with the step 10i of the substrate 10. While a projection provided in the other end of the cut fit with the cut 10j formed in the substrate 10c, thus the substrate 10c is fixed to the upper body 26.

The upper body also has a groove 26e and a beam 26f, both extending across the axis X, in the inner surface thereof. On the other hand, the outer surface of the side wall 16a of the receptacle body 16 provides another beam 16h and another groove 16i. By coupling the groove 26e of the upper body with the beam 16h and the beam 26f with the groove 16i with respect to each other, the receptacle body 16 is fixed and secured to the upper body 26.

The lower body 28 also has a pair of side wall 28a and a bottom wall 28b connecting the side walls 28a. When the lower body is assembled to the upper body 26, the side walls 28a thereof covers the side walls 26a of the upper body, and the substrate 10c is installed and secured in a space formed and sandwiched by upper and lower bodies.

The side wall 28a has leaf slabs 28c formed by bending a portion thereof, and other leaf slabs 28d, which is bent and formed from the bottom wall 28b, is formed in the end of the lower body 28. The leaf slabs 28c press the edges 10g and 10h of the substrate 10 to directions opposite to each other, and the other leaf slabs 28d press the step 10k formed in the substrate 10c to the front direction of the optical module 1. Thus, the substrate 10c is positioned and fixed to the lower body 28. The lower body 28 may be made of metal such as stainless steal and phosphor bronze to mechanically hold and electrically shield the substrate 10c.

The side wall 28a of the lower body 28 has holes 28e and 28f on both end portion thereof. A projection 26g provided in the outer surface 26a of the upper body 26 mates with one hole 28e, while the other projection 26h in the upper body 26 mates with the other hole 28f, thus the upper body 26 is fixed to the lower body 28.

In the outer surface 26a of the upper body provides a groove 26i extending along the axis X for receiving the actuator 20. The groove 26i has a projection 26j in the rear end thereof. The projection 26j includes a hook surface 26k extending along a direction across the axis X, which faces and is butted against the edge 4f of the latch 4e provided in the side of the cage 4. By butting the edge 4f of the latch 4e against the hook surface 26k, the optical module 1 is fixed within the cage and prevented from releasing therefrom. The side wall 28a of the lower body 28 has openings to make the latch 4e in contact with the projection 26j of the upper body 26.

The actuator 20 has a pair of arms 20a and a center portion 20b connecting respective arms 20a. The arm 20a is received in the groove 26i provided in the side wall 26a of the upper body 26. That is, the arm 20a of the actuator is set into the groove 26i of the upper body 26 and the groove 26i, with the arm 20a set therein, covered with the lower body. Therefore, the actuator 20 enables to slide only in the direction along the axis X.

The tip portion of the arm 20a is forked and the forked slabs 20c puts the projection 26j in the groove 26i therebetween. The forked slabs 20c is bent toward the outer side of the optical module such that, when sliding the actuator 20 toward the front side, the forked slab 20c is in contact with the latch 4e and presses the latch toward the outer side of the optical module 1. In other words, the span between the forked slab in respective arms 20a is greater than the length of the center portion 20b, accordingly, sliding the actuator with the arms 20a in the groove 26i, the forked slab presses the latch 4e outward and releases the latching between the projection 26j and the latch 4e.

Figure 5A:
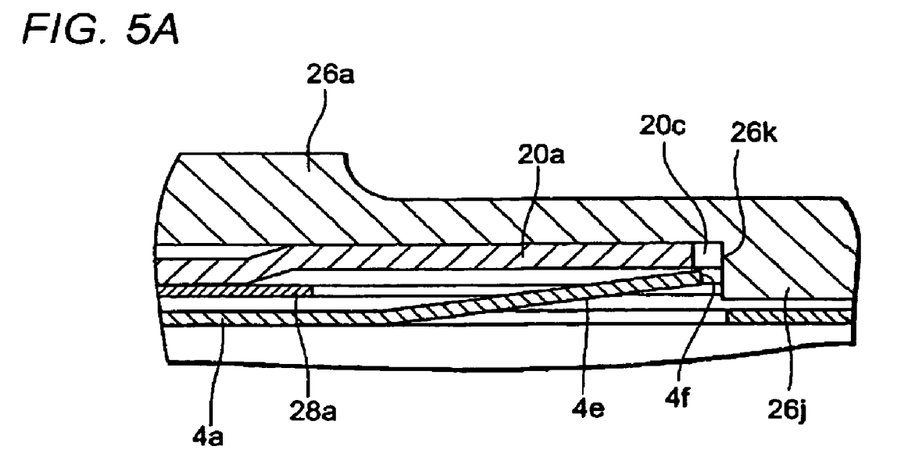
FIG. 5 is a cross sectional view taken of the optical module along the line V-V in FIG. 1.
Figure 5B:
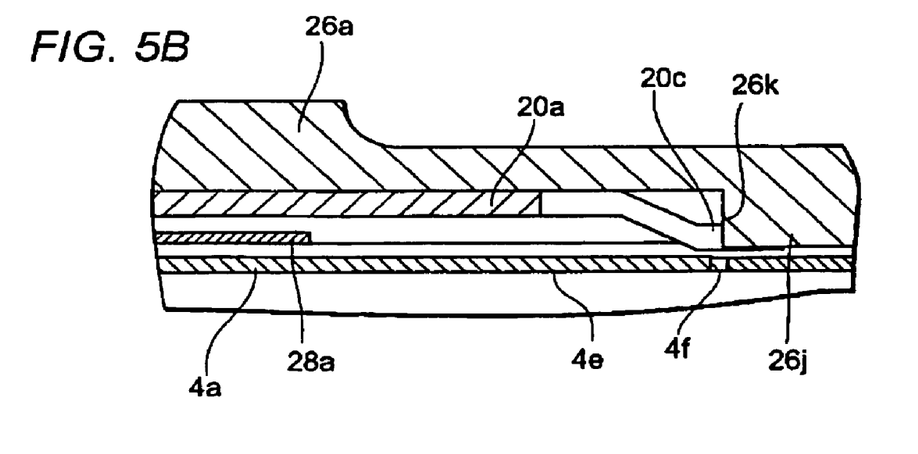

FIG. 6A is a cross sectional view taken along the line V-V in FIG. 1, which shows the state when the optical module 1 is fixed in the cage 4. In this state, the forked slabs 20c sandwich the projection 26j in the groove 26i and positions along the edge 26m of the projection 26j. While, FIG. 5B shows a state that the optical module 1 is released from the cage 4. Sliding the actuator 28 frontward to release the optical module 1 from the cage 4, the edge 4f of the latch 4e is pushed out from the position facing to the hook surface 26k of the projection 26i toward the outer side by the forked slab 20c, which enables to release the optical module 1 from the cage 4. In FIG. 5B, the outer side of the optical module 1 corresponds to the downward in FIG. 5A and FIG. 5B.

Figure 6:
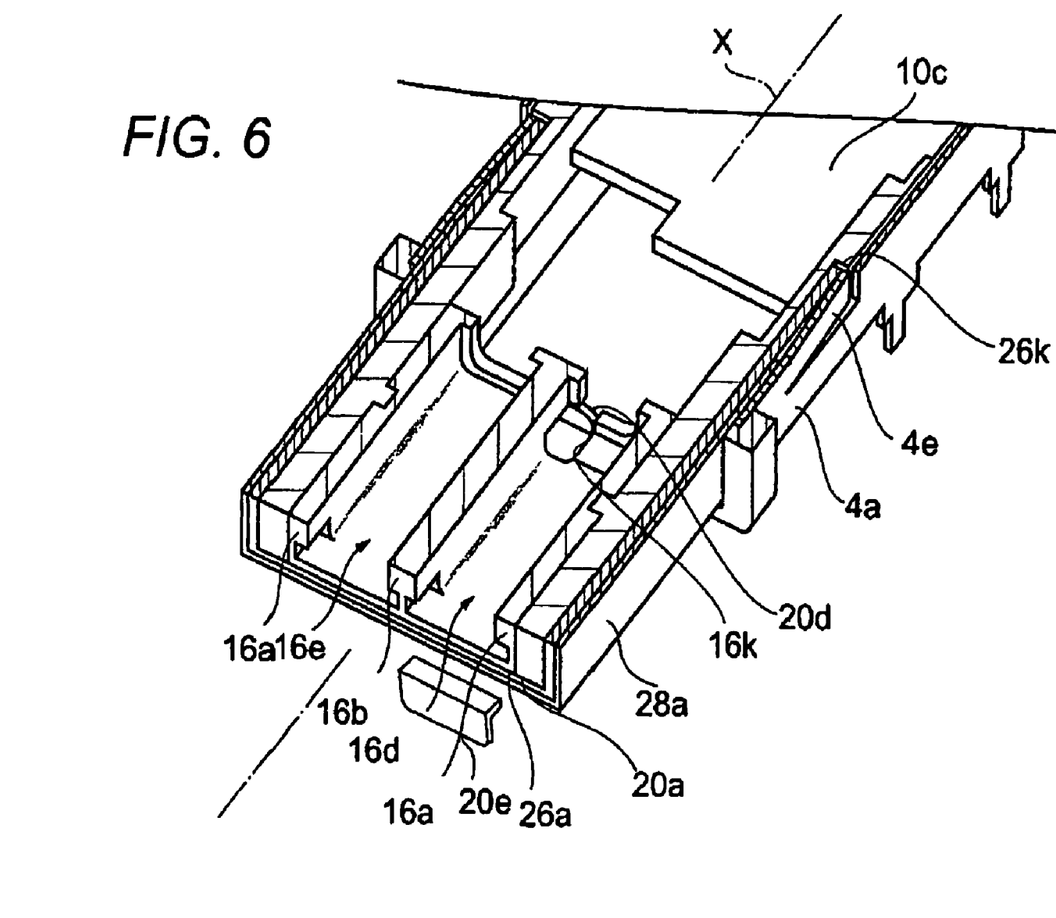
FIG. 6 is a perspective view of the optical module cut along the line VI-VI in FIG. 1.

Referring to FIG. 4 again, in the end portion of the center portion 20b of the actuator 20, a flange 20d bent upward therefrom is provided. The flange 20d protrudes in the receptacles 16e and 16d. FIG. 6 shows a cross sectional view, taken along the line VI-VI in FIG. 1 and illustrated in perspective, of the front portion of the optical module 1. In the rear end of the bottom 16c of the receptacle body 16, a guide opening 16k is provided to protrude the flange 20d into the receptacles 16d and 16e. The flange 20d is in contact with the outer surface of the connector 24 in the receptacles 16d and 16e. Therefore, when the connector 24 is inserted into the receptacles 16d and 16e, and is fixed thereto, the flange 20d butts against the optical connector 24, the optical connector is fixed to the receptacle body 16 by hook 24 thereof, thus the actuator 20 can not be pulled out from the optical module 1. The width of the flange 20d is preferably smaller than one third of that of the optical connector, because in the receptacle body 16 thus configured, the side walls 16a, the partition wall 16b and the bottom 16c may not reduce in its holding mechanism for the optical connector therein by the existence of the guide opening 16k.

The guide opening 16 has a substantial length along the axis X to guide the flange 20d from a first position to a second position. The first position corresponds to the edge portion of the receptacle body, and the flange, when the optical connector 24 is inserted in the receptacles 16d and 16e, slides to the first position. The flange 20d is prohibited to slide at the first position by the existence of the optical connector 24. Accordingly, the optical module 1 cannot be released from the cage 4 when the optical connector 24 is installed into the optical receptacles 16d and 16e.

The second position of the flange 20d corresponds to the front end of the guide opening 16k. When the actuator slides to the front end and the flange 20d moves to the second position, the latch 4e of the cage 4 is pushed outward by the forked slabs 20c provided in the arm 20a of the actuator 20, and the optical module 1 can be released from the cage 4.

Moreover, the actuator 20 has another flange 20e bent downward in the front edge of the center portion 20b thereof. This flange 20e is usable to slide the actuator 20 when the bail, described in detail below, is not provided in the optical module 1.

The side portion 20a of the actuator 20 has holes 20f. Further, the side wall 28a of the lower body 28 may provide slot 28h extending along the axis X and communicating with the hole 20f of the actuator 20. The shaft 22a of the bail 22 is inserted into the hole 20a of the actuator 20 via the slot 28h of the lower body 28. The bail 20 is usable to pull out the optical module 1 from the cage 4. In the present embodiment shown in FIG. 2, the bail 22 has a grip 22b pivotable in the front of the receptacles 16d and 16e.

When the optical connector 24 mates with the receptacles 16d and 16e, the grip 22b of the bail 22 may pivot in upward or downward. In the present embodiment, the slot 28h provided in the lower body 28 continues to another slot 28i extending in a direction perpendicular to the axis X. Pivoting the grip 22b in upward or downward, the corner portion 22c of the bail may mate with the other slot 28i.

Second Embodiment

Figure 7:
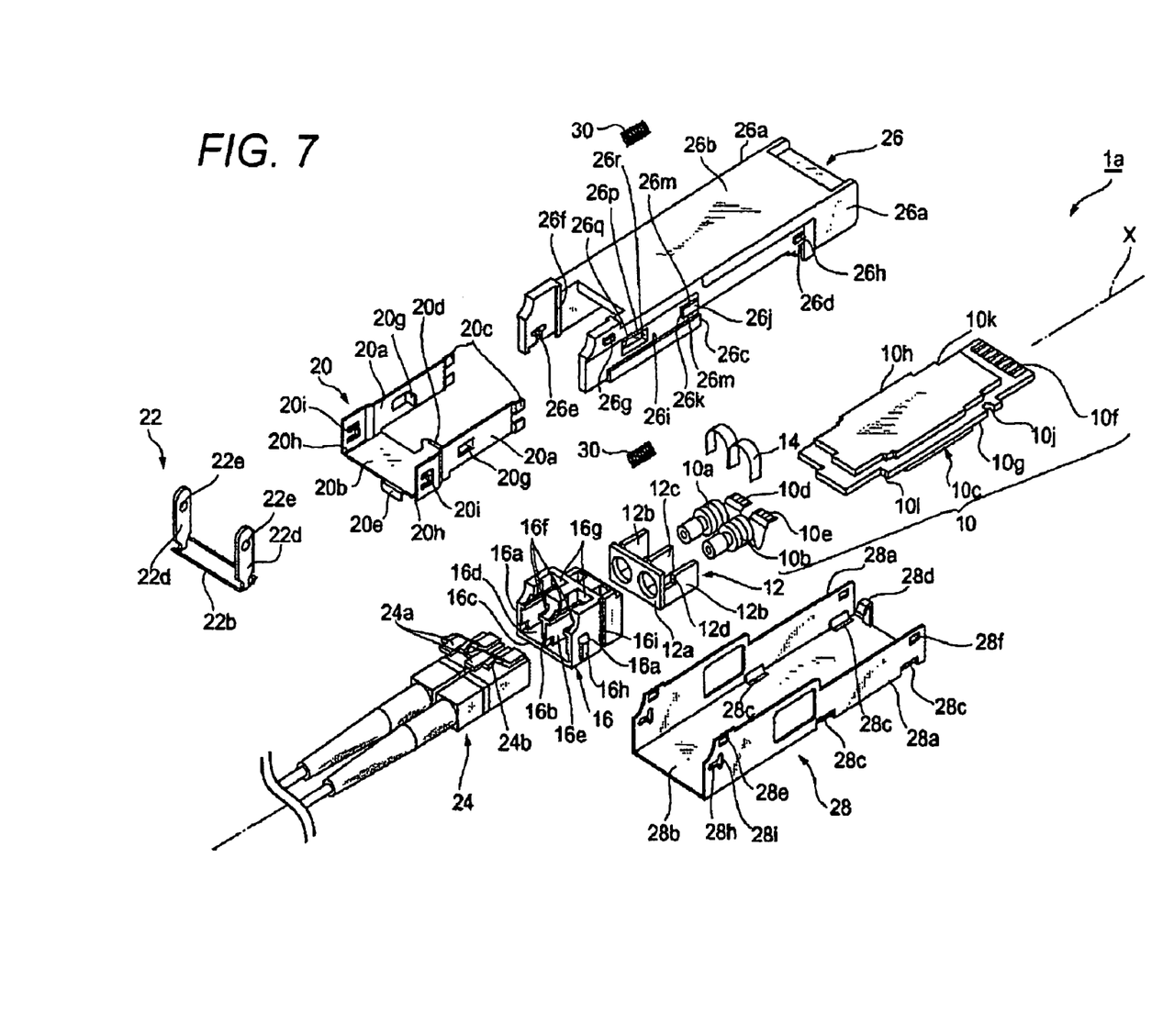
FIG. 7 is an exploded view of the optical module according to the second embodiment of the present invention.

FIG. 7 is an exploded view of an optical module 1a according to the present embodiment. The optical module 1a, similar to the first embodiment shown in FIG. 4, includes a primary unit 10, a holder 12, a bracket 14, a receptacle body 16, a housing 18, an actuator 20 and a bail 22. In the modified optical module 1a, the upper body 26, the actuator 20, and the bail are different to corresponding elements in the first embodiment. Further, the optical module 1a of the second embodiment includes a spring 30.

As shown in FIG. 7, the actuator 20 in the arm 20a thereof provides a projection 20i cut therefrom and bent inward. Between the arm 20a and the center portion 20b of the actuator 20 is cut by a length from the front edge thereof. Further, the front side walls 20h of the actuator 20 is expanded outward with respect to the arm 20a.

The bail 22 in the present embodiment also has a grip 22b and a pair of arms 22d bent from the grip 22b, and the hole 22e in the arm 22d. The bail 22, the arm 22d of which passes through the cut provided between the front side wall 20a and the center portion 20b of the actuator 20, is fixed to the actuator 20 by the projection 20i being inserted in the hole 22e in the arm 22d.

The actuator 20 further provides another flange 20g in the arm 20a. The other flange 20g is cut from the arm 20a and bent inward such that the surface of the other flange 20g extends along a direction intersecting the axis X. On the other hand, the side wall 26a of the upper body 26 further provides another groove 26p into which the other flange 20g of the actuator is inserted. The other groove 26p has a pair of inner surfaces 26q and 26r, both extending in the direction intersecting the axis X. A spring 30 is inserted between the other flange 20g and one of the inner surface 26q of the groove 26p.

Figure 8:
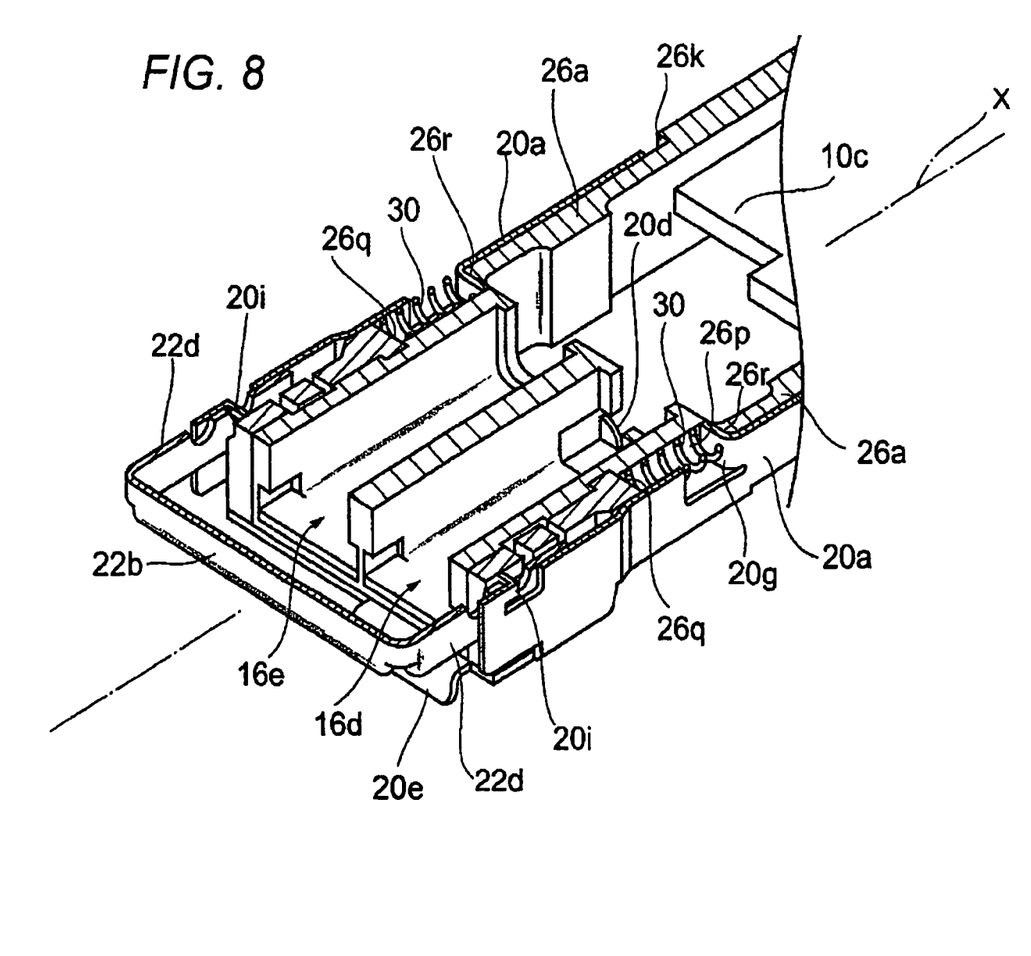
FIG. 8 is a perspective view of the optical module according to the second embodiment showing the actuator pushed rearward by the spring.

FIG. 8 is a cross sectional view of the optical module 1a illustrated in perspective, and shows the state when actuator 20 is pushed therein. The spring 30, in the ordinal position, presses the other flange 20g to touch the other surface 26r of the groove 26p, and the flange 20d, provided in the center portion 20b of the actuator, is set in the first position. That is, the spring 30 normally holds the actuator 20 in the position such that the latch 4e of the cage 4 may not release from the projection in the upper body.

Figure 9:
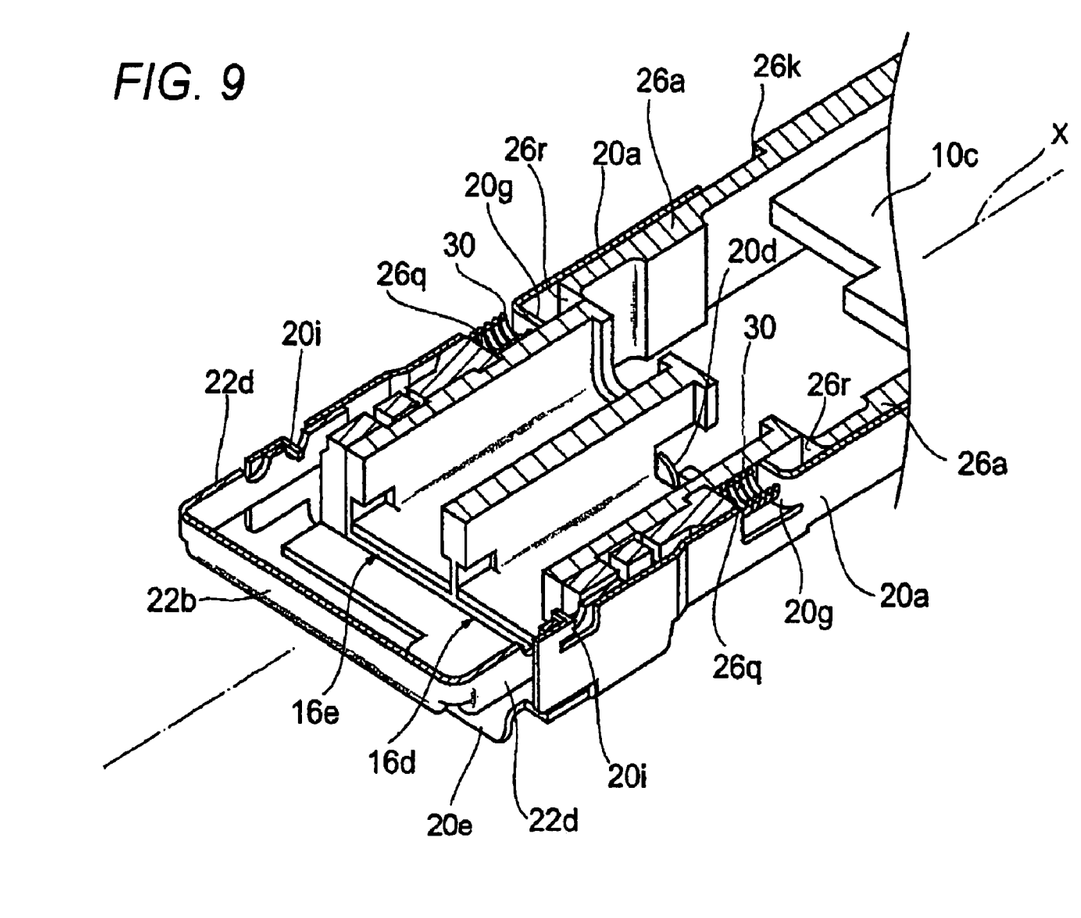
FIG. 9 is a perspective view of the optical module according to the second embodiment showing the actuator pulled frontward.

FIG. 9 is also a partially cut perspective view showing the state that the actuator 20 is pulled out. The spring is shrank by the flange 20g, and the latch 4e of the cage 4 is released from the projection 26j of the upper body 26. Even when the actuator is pulled out, since the side wall 28a of the lower body 28 covers the groove 26p of the upper body, the spring 30 does not bound out from the groove 26p.

Thus, the optical module 1a of the present embodiment, even when the optical connector does not exist in the optical receptacles 16d and 16e, the optical module 1a is fixed to the cage 4, because the spring 30 forces the actuator 20 to the first position not to release the optical module 1a from the cage 4. Therefore, as long as an external force to shrink the spring is not operated, the optical module 1a can not release from the cage 4.

In figures from FIG. 7 to FIG. 9, the bail 22 is set inside of the actuator 20, and, when the actuator 20 is in the first position at which the optical module 1a is latched to the cage 4, the bail 22 is set in one of the upward and the downward position relative to the optical module 1a.

Third Embodiment

Figure 10:
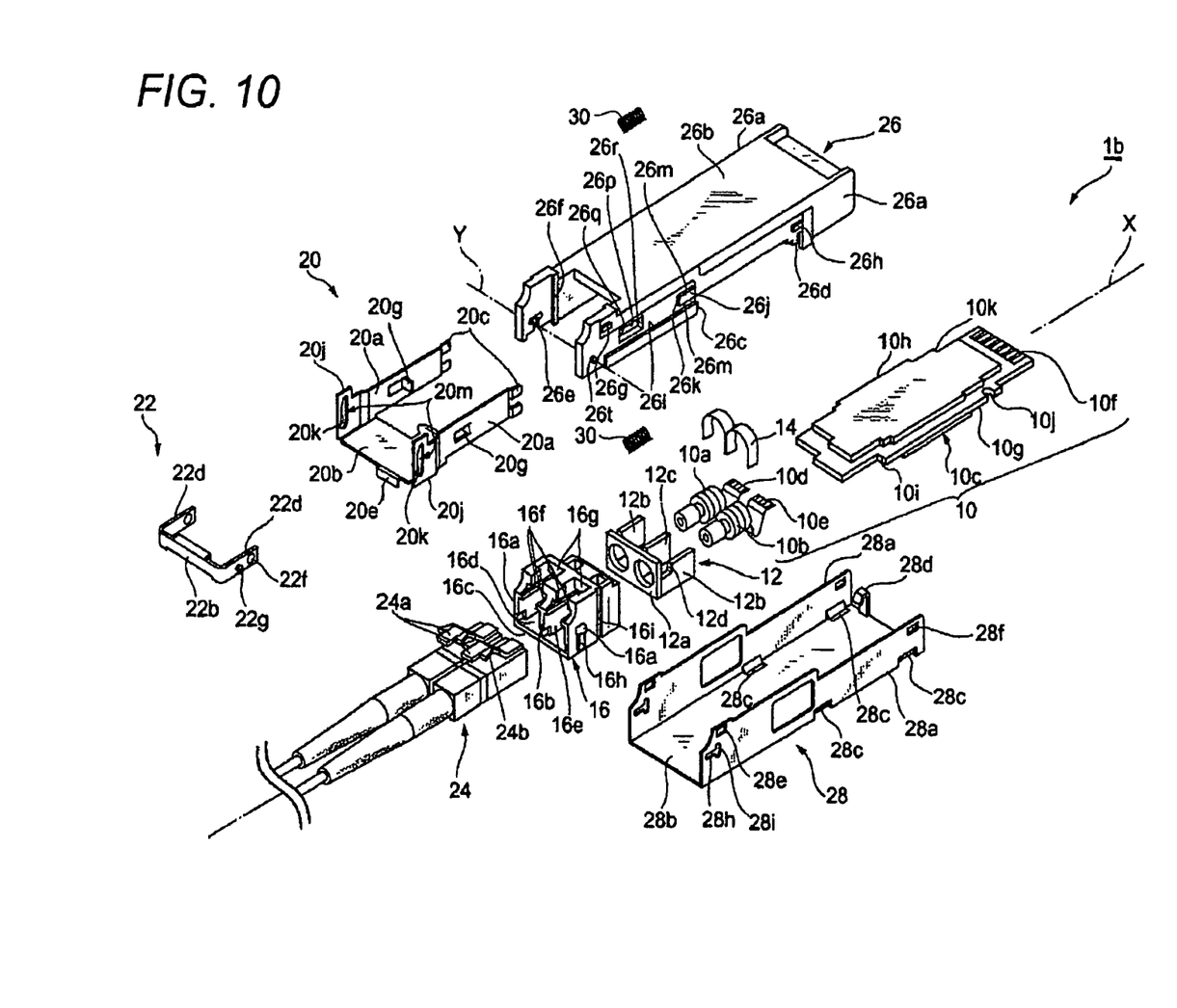
FIG. 10 is an exploded view of the optical module according to the third embodiment of the present invention.

FIG. 10 is an exploded view showing an optical module 1b according to the third embodiment of the present invention. The optical module 1b, similar to the optical module 1a of the second embodiment, includes a primary unit 10, a holder 12, a bracket 14, a receptacle body 16, a housing 18, an actuator 20, a bail 22, and a spring 30. In the present optical module 1b, the arrangement of the upper body 26, the actuator 20, and the bail are different to those contained in the optical module 1a of the second embodiment.

As shown in FIG. 10, the thickness of the side wall 20a in the front end portion of the upper body 20 is formed thin to coincide with the bottom surface of the groove 20i. Further, in the front end portion of the side wall 10a provides a pair of projections 26t extending along another axis Y.

The leg portion 22d of the bail 22 provides a hole 22f and a projection 22g, both extending along the axis Y. The bail 22 is able to pivot around the projection 26t, namely around the axis Y, by inserting the projection into the hole 22f of the leg portion 22d.

The actuator 20 in the present embodiment provides a slot 20m in the front end portion 20j thereof, the inner surface 20k of which becomes a sliding surface. That is, the projection 22g provided in the bail 22, inserting into the slot 20m, slides on the inner surface of the slot 20m as the bail 22 pivots around the axis Y, and moves the actuator 20 with respect to the upper body 26.

Figure 11:
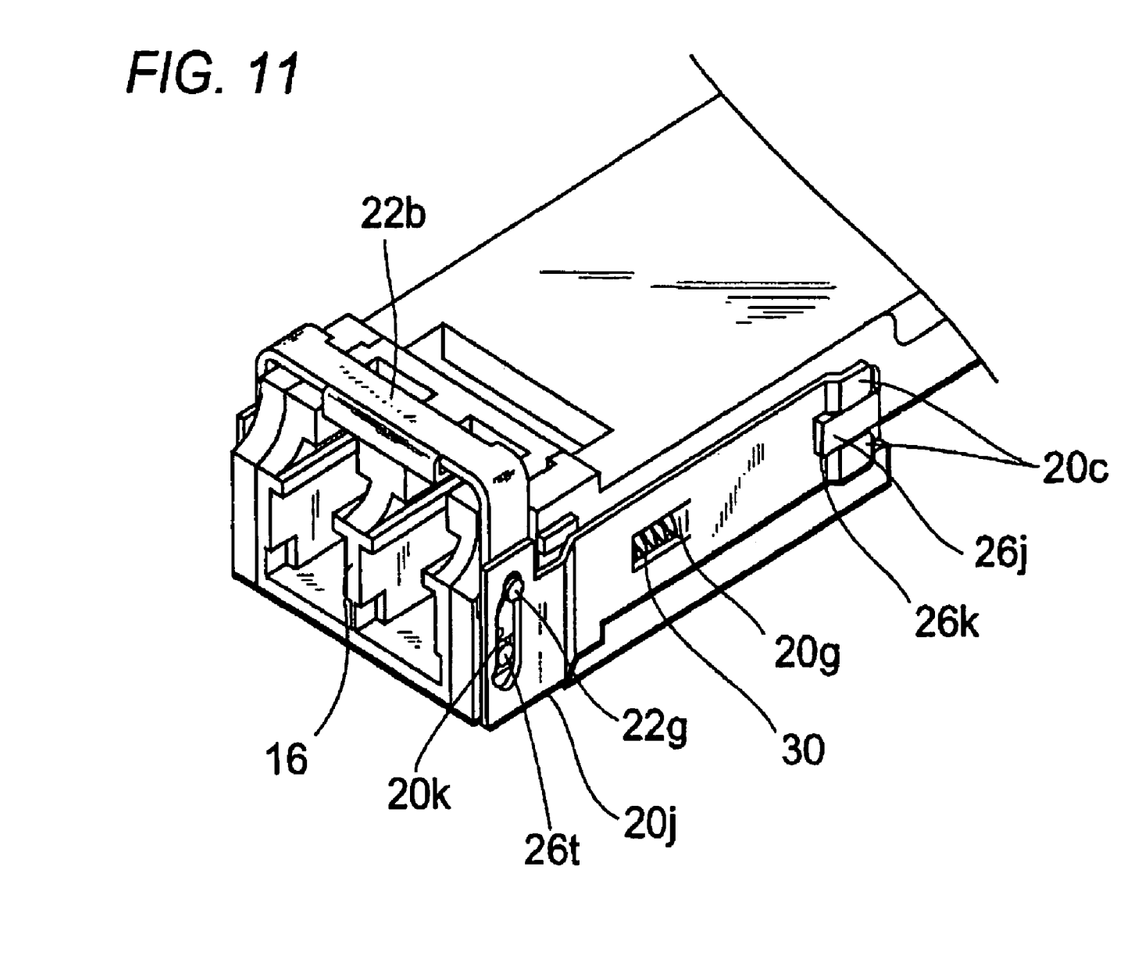
FIG. 11 is an enlarged view of the front portion of the optical module according to the third embodiment, in which the bail is positioned where the actuator is set in the first position.
Figure 12:
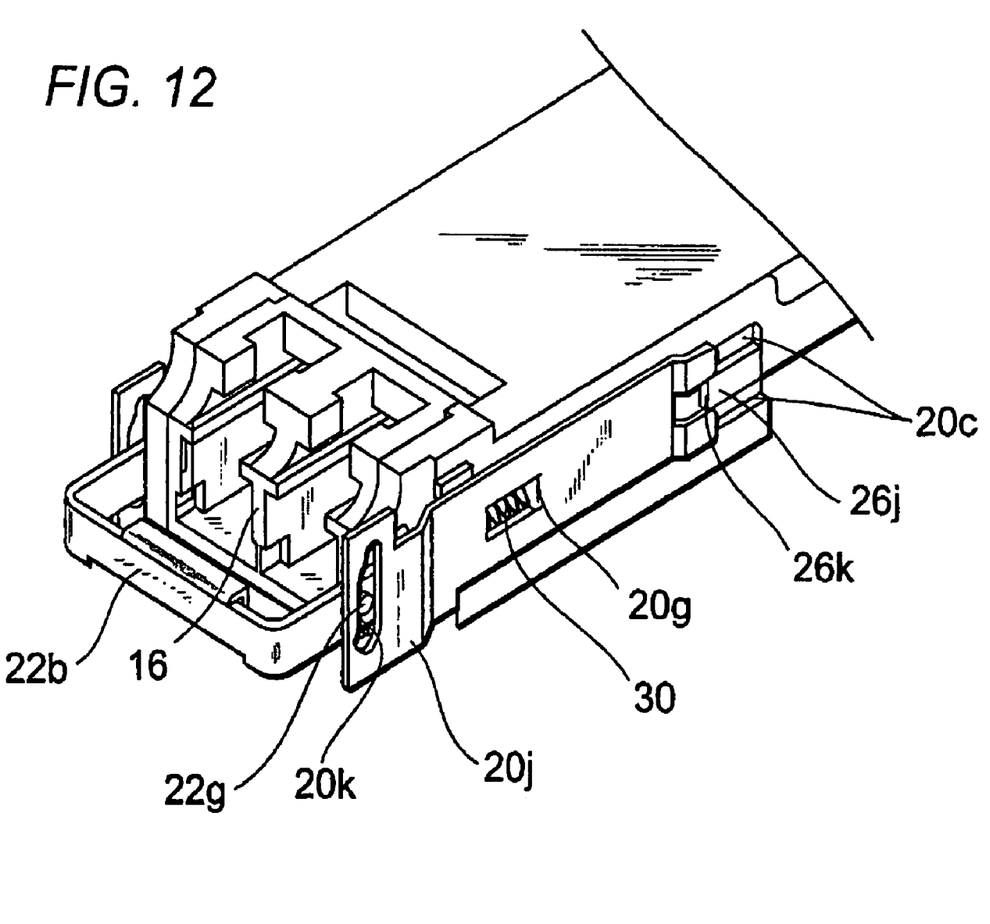
FIG. 12 is an enlarged view of the front portion of the optical module according to the third embodiment, in which the bail is positioned where the actuator is set in the second position.

FIG. 11 shows a positional relation ship between the actuator 20 and the bail 22 when the optical module 1b is latched with the cage 4, while FIG. 12 shows the relation ship when the optical module 1b is in the released state. In these figures, the lower body 28 is not shown.

The flange 20g of the actuator 20 is pressed in backward by the spring 30, accordingly, the forked slab 20c provided in the edge of the arm 20a of the actuator 20 is set in the lock position. In this state, the projection 22g provided in the leg portion of the bail 22 is slid to the top of the slot 20m, and the grip 22b of the bail 22 is set in the upward position relative to the receptacle body 16.

On the other hand, pivoting the bail around the axis Y, the projection 22g slides on the inner surface 20k of the slot 20m and moves to the front position as shown in FIG. 12. The stroke length of the bail 22 by pivoting corresponds to the length to slide the forked slab 20c from the position where the latch 4e of the cage 4 faces to the projection 26j, the first position, to the releasing position, namely, the second position.

In FIG. 11, although the bail 22 is set in the upward position when the optical module 1b is latched to the cage 4, the bail 22 may be set in the downward position, that is, the projection 22g positions in the bottom of the slot 20m. The projection 26t provided in the side wall 26a of the upper body vertically positions nearly in the middle of the upper body 26, accordingly, the bail 22 may be set in the upward or the downward position when the optical module 1b is in the latched state.

Thus, in the optical module 1b, pivoting the bail 22 may slide the forked slab 20s from/to the position where the optical module latches with or release from the cage 4. Further, since the actuator 20 is pressed by the spring, the bail 22 is automatically positioned where the latch 4e of the cage 4 faces to the projection 26c provided in the side wall 26a of the upper body 26.

Thus, the bail 22 is provided in the optical module 1, and the bail 22 may be set in upward and downward position when the optical connector mates with the receptacle 16. Therefore, the optical module 1 can be installed in a pile-up configuration.

Although the optical module 1b provides the projection 26t in the upper body and the hole in the bail 22, it may be applicable that the hole and the projection are respectively provided in the opposite element, namely, the hole in the upper body and the projection in the leg portion of the bail.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. An optical module plugged in a space defined by a cage mounted on a host board, said cage including a resilient latch protruding into said space, comprising:
    a housing including upper and lower bodies, said upper body including a pair of front side walls each providing first and second projections, said second projection butting against an edge of said resilient latch when said optical module is plugged in said cage;
    an actuator slidable between first and second positions, said actuator including a pair of front end portions each providing a slot and a pair of arms each extending from said front end portion, said pair of arms sandwiching said front side walls of said upper body therebetween;
    a receptacle body put between said pair of front end portions of said actuator; and
    a bail including a pair of arms each providing a hole and a projection and being inserted between said side wall of said upper body and said pair of front end portions of said actuator, each hole of said bail mating with said respective first projection of said upper body and each projection of said bail being inserted into said respective slot of said front end portions of said actuator,
    wherein said actuator slides from said first position to said second position by pivoting said bail on said first projections of said upper body and sliding said projections of said bail within said slots of said actuator to release said butting of said resilient latch of said cage against said second projections of said upper body.

2. The optical module according to claim 1,
    wherein said bail is set in an upward position or in a downward position relative to said receptacle body when said actuator is set in said first position.

3. The optical module according to claim 1,
    wherein said first position of said actuator corresponds to a position where said projections of said bail are in one end of said slots, and said second position of said actuator corresponds to a position where said projections of said bail are in a center of said slots.

4. The optical module according to claim 1,
    wherein a span between said pair of said front end portions of said actuator is greater than a length between said arms of said bail, said bail being positioned inside of said front end portion of said actuator.

5. The optical module according to claim 1, wherein said pair of arms of said actuator each has a forked end with two branches sandwiching said respective second projection of said upper body, and
    wherein said forked end pushes said resilient latch of said cage outward when said actuator is set in said second position.

6. The optical module according to claim 5,
    wherein said side walls of said upper body each provides a groove in an outer surface thereof to receive each arm of said actuator.

7. The optical module according to claim 1,
    wherein said lower body provides an opening, said second projection of said upper body protruding through said opening to butt against said resilient latch of said cage.

8. The optical module according to claim 1,
    wherein said optical module further includes a spring, said arm of said actuator provides a flange, and said pair of front side walls of said housing each provides a groove to set said spring therein and said flange of said arm, and
    wherein said spring sets said actuator in said first position when no force is applied to said bail by pushing said flange of said arm with said spring set in said groove.

9. An optical module plugged in a space defined by a cage mounted on a host board, said cage including a resilient latch protruding into said space, comprising:
    a housing including upper and lower bodies, said upper body including a pair of front side walls each providing first and second projections and a groove, said second projections butting against an edge of said resilient latch when said optical module is plugged in said cage;
    an actuator slidable between first and second positions, said actuator including a pair of front end portions each providing a slot and a pair of arms each extending from said front end portion and providing a flange set within said groove of said front side wall of said upper body, said pair of arms sandwiching said front side walls of said upper body therebetween;
    a receptacle body sandwiched between said pair of front end portions of said actuator;
    a spring set within said groove of said front side wall of said upper body; and
    a bail including a pair of arms each providing a hole and a projection and being inserted between said side wall of said upper body and said pair of front end portions of said actuator, each hole of said bail mating with said respective first projections of said upper body and each projection of said bail being inserted into said respective slot of said front end portion of said actuator;
    wherein said actuator slides from said first position to said second position by pivoting said bail on said first projections of said upper body and sliding said projections of said bail within said respective slots of said actuator to release said butting of said resilient latch of said cage against said second projections of said upper body; and
    wherein said spring sets said actuator in said first position when no force is applied to said bail by pushing said flange of said arm with said spring.

* * * * *